(12) United States Patent
Okuma et al.

(10) Patent No.: US 10,309,836 B2
(45) Date of Patent: Jun. 4, 2019

(54) COLLIMATION EVALUATION DEVICE AND COLLIMATION EVALUATION METHOD

(71) Applicant: HAMAMATSU PHOTONICS K.K., Hamamatsu-shi, Shizuoka (JP)

(72) Inventors: Junji Okuma, Hamamatsu (JP); Yasunori Igasaki, Hamamatsu (JP); Yasunaga Nara, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/331,036

(22) Filed: Oct. 21, 2016

(65) Prior Publication Data
US 2017/0199083 A1    Jul. 13, 2017

(30) Foreign Application Priority Data
Aug. 25, 2015   (JP) .................................. 2015-165801

(51) Int. Cl.
*G01B 9/02*    (2006.01)
*G01J 9/02*    (2006.01)

(52) U.S. Cl.
CPC ..... *G01J 9/0215* (2013.01); *G01J 2009/0223* (2013.01); *G01J 2009/0234* (2013.01)

(58) Field of Classification Search
CPC ............. G01B 9/02098; G01B 9/02032; G01J 9/0215; G01J 9/0223; G01J 9/0234
USPC ........................................................ 356/520
See application file for complete search history.

(56) References Cited

U.S. PATENT DOCUMENTS

2004/0051877 A1 *   3/2004  Erwin ................... G01J 9/0215
356/520

FOREIGN PATENT DOCUMENTS

| JP | 2001-336914 A | 12/2001 |
|----|---------------|---------|
| JP | 4114847 B2    | 7/2008  |
| JP | 2009-103592 A | 5/2009  |
| WO | WO-2016/017706 A1 | 2/2016 |

OTHER PUBLICATIONS

Double-wedge-plate interferometer for collimation testing: new configurations, Sriram et al, Aug. 1, 1993 / vol. 32, No. 22 / Applied Optics.*

(Continued)

*Primary Examiner* — Tarifur R Chowdhury
*Assistant Examiner* — Jonathon Cook
(74) *Attorney, Agent, or Firm* — Drinker Biddle & Reath LLP

(57) ABSTRACT

A collimation evaluation device includes a first reflection member, a second reflection member, a screen, and a housing. A first reflection surface of the first reflection member and a first reflection surface of the second reflection member face each other and are parallel to each other. Further, interference fringes are formed on the screen by light $L_{12}$ reflected on the first reflection surface of the first reflection member and a second reflection surface of the second reflection member and light $L_{21}$ reflected on a second reflection surface of the first reflection member and the first reflection surface of the second reflection member, and collimation of incident light is evaluated on the basis of a direction of the interference fringes.

6 Claims, 10 Drawing Sheets

(56) References Cited

OTHER PUBLICATIONS

F. Staub et al., "Collimation tester for ultrashort pulses and short coherence length lasers," Optik Optics, 2006, pp. 193-195, vol. 117, No. 4.

K.V. Sriram et al., "Self-referencing collimation testing techniques," Optical Engineering, Jan. 1993, pp. 94-100, vol. 32, No. 1.

De-Yan Xu et al., "Rotatable single wedge plate shearing interference technique for collimation testing," Optical Engineering, Apr. 1991, pp. 391-396, vol. 30, No. 4.

Li Gouhua et al., "Improved wedge-plate shearing interferometric technique for a collimation test," Applied Optics, Aug. 1, 1992, pp. 4363-4364, vol. 31, No. 22.

\* cited by examiner

DIVERGING BEAM

COLLIMATED BEAM

CONVERGING BEAM

DIVERGING BEAM

COLLIMATED BEAM

CONVERGING BEAM

COLLIMATION EVALUATION DEVICE AND COLLIMATION EVALUATION METHOD

BACKGROUND OF THE INVENTION

Field of the Invention

The present invention relates to a device and a method for evaluating collimation of light.

Related Background Art

In various optical systems, the frequency of converting (collimating) diverging light emitted from a point light source (including a light source regarded as the point light source) into parallel light is high. As examples of the point light source, there are a laser diode and an optical fiber emission end. A distance between the point light source and a collimation optical system is appropriately set, so that the diverging light emitted from the point light source can be converted into the parallel light by the collimation optical system. Technologies for evaluating a degree of parallelization (degree of collimation) of the parallel light generated as described above are described in Patent Documents 1 and 2.

In particular, according to the technology described in Patent Document 1, collimation of light can be easily evaluated using a shear plate having a first reflection surface and a second reflection surface which are non-parallel to each other. That is, a collimation evaluation device using the shear plate causes light reflected on the first reflection surface of the shear plate and light transmitted through the first reflection surface of the shear plate and being reflected on the second reflection surface to interfere with each other on a screen, and can evaluate collimation of the light on the basis of a direction of interference fringes on the screen. The shear plate may be called a shearing plate.

Patent Document 1: Japanese Patent Application Laid-Open Publication No. 2001-336914

Patent Document 2: Japanese Patent Publication No. 4114847

SUMMARY OF THE INVENTION

In the collimation evaluation device using the shear plate described above, it is demanded to increase a thickness of the shear plate and decrease an angle (wedge angle) formed by the two reflection surfaces of the shear plate, for detecting a change in the direction of the interference fringes on the screen with high sensitivity. In particular, because the wedge angle affects the spacing of the interference fringes, the wedge angle is determined to some degree by the interference fringe spacing suitable for a collimation evaluation. Therefore, the thickness of the shear plate is increased for improving sensitivity.

An optical path difference is generated between light components until the light components are reflected on the two reflection surfaces of the shear plate and arrive at the screen. When the thickness of the shear plate increases, the optical path difference increases. Meanwhile, when the optical path difference is smaller than a coherence length of light of a collimation evaluation object, the interference fringes can be observed on the screen.

For example, CW laser light output from a HeNe laser light source has a coherence length of the order of 100 mm. Pulse laser light output from a solid-state laser light source with a pulse width of 40 ns has a coherence length of several mm. Further, pulse laser light output from an optical fiber laser light source with a pulse width of 40 ns has a coherence length of 1 mm or less. In general, laser light of a short pulse output from the solid-state laser light source or the optical fiber laser light source has a short coherence length due to a multi longitudinal mode or spectral broadening.

When the thickness of the shear plate is increased to improve the sensitivity, the optical path difference increases, and a collimation evaluation of light of which a coherence length is shorter than the optical path difference cannot be executed. As described above, conventionally, in the collimation evaluation device using the shear plate, it is difficult to evaluate collimation of light of which a coherence length is short with high sensitivity.

The present inventors have performed research and development in order to develop collimation evaluation technology capable of evaluating collimation of light of which a coherence length is short with high sensitivity and have come up with the idea of collimation evaluation technology capable of improving the sensitivity. However, the present inventors have found that a different problem such as deterioration of contrast of interference fringes occurs in the technology, and have performed further research and development and have finished the present invention.

The present invention has been made to solve the above problem, and an object thereof is to provide a device and a method that can evaluate collimation of light of a collimation evaluation object with high sensitivity and high contrast, even when a coherence length of the light is short.

A collimation evaluation device according to the present invention includes (1) a first reflection member having a first reflection surface for reflecting a part of incident light and a second reflection surface for reflecting light transmitted through the first reflection surface in the incident light, and (2) a second reflection member having a first reflection surface for reflecting a part of light emitted from the first reflection member and a second reflection surface for reflecting light transmitted through the first reflection surface in the light. In the collimation evaluation device according to the present invention, the first reflection surface of the first reflection member and the first reflection surface of the second reflection member face each other and are parallel to each other, and collimation of the incident light is evaluated on the basis of a direction of interference fringes formed by light reflected on the first reflection surface of the first reflection member and the second reflection surface of the second reflection member and light reflected on the second reflection surface of the first reflection member and the first reflection surface of the second reflection member.

A collimation evaluation method according to the present invention uses (1) a first reflection member having a first reflection surface for reflecting a part of incident light and a second reflection surface for reflecting light transmitted through the first reflection surface in the incident light, and (2) a second reflection member having a first reflection surface for reflecting a part of light emitted from the first reflection member and a second reflection surface for reflecting light transmitted through the first reflection surface in the light. The collimation evaluation method according to the present invention includes causing the first reflection surface of the first reflection member and the first reflection surface of the second reflection member to face each other and to be parallel to each other, observing interference fringes formed by light reflected on the first reflection surface of the first reflection member and the second reflection surface of the second reflection member and light reflected on the second reflection surface of the first reflection member and the first reflection surface of the second reflection member, and evaluating collimation of the incident light on the basis of a direction of the observed interference fringes.

In the collimation evaluation device and the collimation evaluation method described above, light of a collimation evaluation object is first incident on the first reflection member, a part of the light is reflected on the first reflection surface of the first reflection member, and light transmitted through the first reflection surface is reflected on the second reflection surface of the first reflection member. Light reflected on the first reflection member is then incident on the second reflection member, a part of the light is reflected on the first reflection surface of the second reflection member, and light transmitted through the first reflection surface is reflected on the second reflection surface of the second reflection member.

In these reflected light components, an optical path difference between light $L_{12}$ reflected on the first reflection surface of the first reflection member and the second reflection surface of the second reflection member and light $L_{21}$ reflected on the second reflection surface of the first reflection member and the first reflection surface of the second reflection member can be set to be smaller than a coherence length, and therefore, interference fringes caused by the two reflected light components $L_{12}$ and $L_{21}$ can be observed. Collimation of the incident light can be evaluated on the basis of a direction of the observed interference fringes. In addition, because the first reflection surface of the first reflection member and the first reflection surface of the second reflection member face each other and are parallel to each other, it is possible to cause other reflected light not to be incident on an interference fringe formation region.

According to the present invention, even when a coherence length of light of a collimation evaluation object is short, collimation of the light can be evaluated with high sensitivity and high contrast.

DESCRIPTION OF THE EMBODIMENTS

Hereinafter, an embodiment of the present invention will be described in detail with reference to the accompanying drawings. In the description of the drawings, the same elements will be denoted by the same reference signs, without redundant description. The present invention is not limited to the exemplary embodiment. Configurations of comparative examples are first described and a configuration of the embodiment is then described. In addition, a xyz orthogonal coordinate system is illustrated in the individual drawings for the convenience of the description.

First Comparative Example

Figure 1:
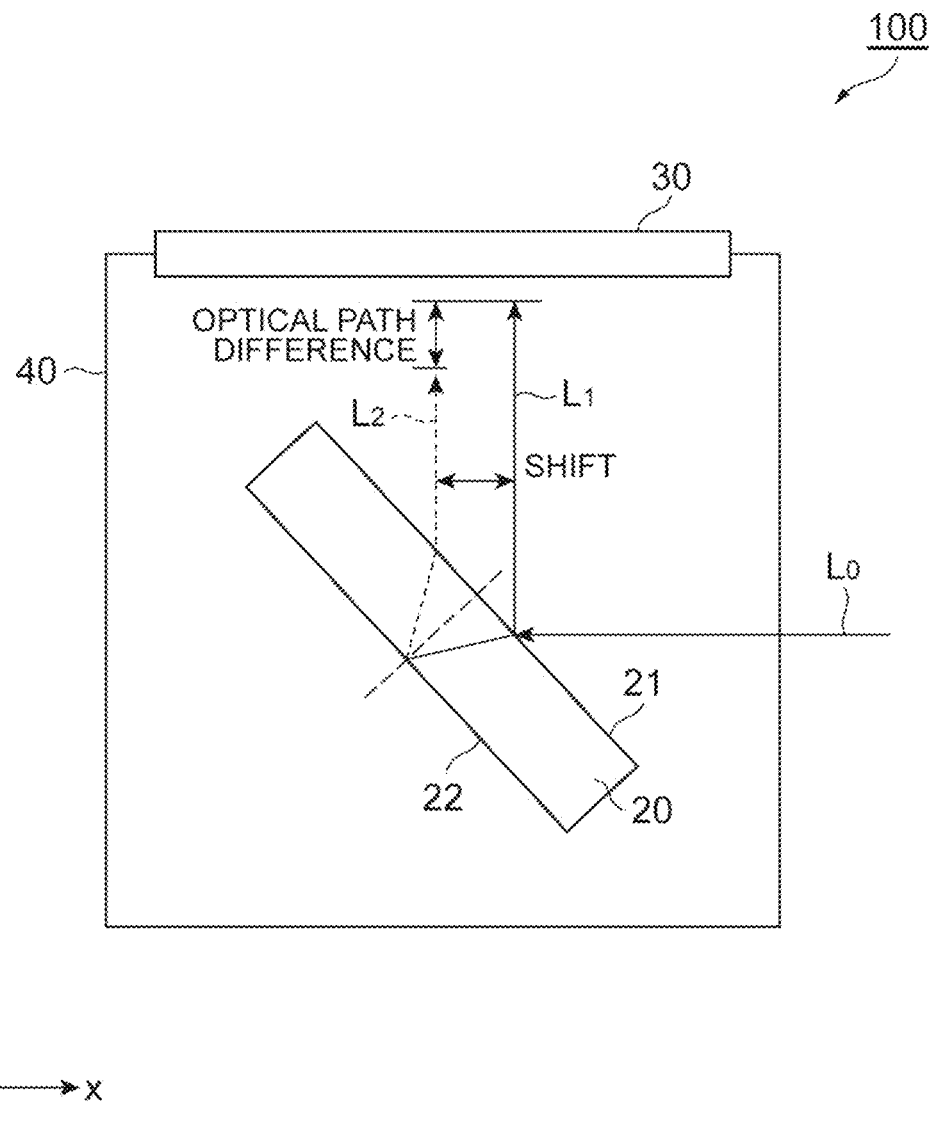
FIG. 1 is a diagram illustrating a configuration of a collimation evaluation device 100 according to a first comparative example.

FIG. 1 is a diagram illustrating a configuration of a collimation evaluation device 100 according to a first comparative example. The collimation evaluation device 100 according to the first comparative example includes a reflection member 20, a screen 30, and a housing 40. The reflection member 20 and the screen 30 are fixed to the housing 40. It is assumed that a direction where light $L_0$ of a collimation evaluation object is incident into the collimation evaluation device 100 is parallel to an x axis.

The reflection member 20 is a shear plate made of a transparent flat plate that has a first reflection surface 21 and a second reflection surface 22 opposite to each other. A material of the transparent flat plate is, for example, BK7 or synthetic quartz. The reflection member 20 is disposed to reflect the light $L_0$ incident in parallel to the x axis and emit the reflected light in parallel to a z axis. Flatness of the first reflection surface 21 and the second reflection surface 22 is about a fraction of a wavelength of evaluation object light. The first reflection surface 21 and the second reflection surface 22 are non-parallel to each other, a distance between the reflection surfaces changes along a direction parallel to a y axis, and the surfaces form an angle (wedge angle) of about several tens of seconds to several minutes.

The screen 30 is a ground glass plate that is disposed to be parallel to both the x axis and the y axis. Reflected light components $L_1$ and $L_2$ that are respectively reflected on the first reflection surface 21 and the second reflection surface 22 of the reflection member 20 are incident on the screen 30. Interference fringes are formed on the screen 30 by the two light components $L_1$ and $L_2$ and the interference fringes can be observed.

In the collimation evaluation device 100, the evaluation object light $L_0$ is incident on the reflection member 20 in parallel to the x axis. A part of the incident light $L_0$ is reflected on the first reflection surface 21 and the reflected light $L_1$ thereof is incident on the screen 30 in parallel to the z axis. In the incident light $L_0$, light transmitted through the first reflection surface 21 is reflected on the second reflection surface 22 and the reflected light $L_2$ thereof is incident on the screen 30 in parallel to the z axis. The reflected light component $L_1$ and the reflected light component $L_2$ incident on the screen 30 are shifted in a direction parallel to the x axis by a distance according to a thickness of the reflection member 20 and an optical path difference according to the thickness of the reflection member 20 is generated.

Figure 2A:
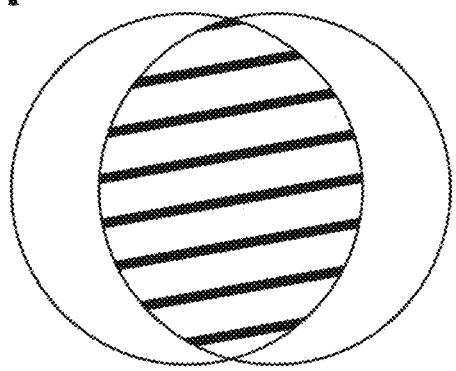
FIG. 2A to FIG. 2C are diagrams illustrating interference fringes formed on a screen 30 of the collimation evaluation device 100 according to the first comparative example.
Figure 2B:
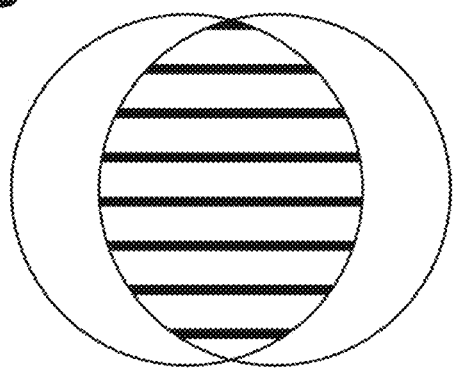
Figure 2C:
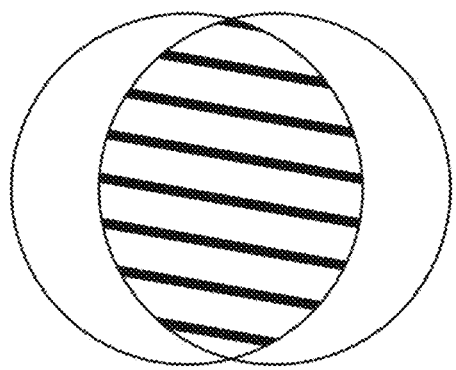
Figure 2C:
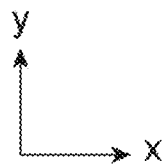

FIG. 2A to FIG. 2C are diagrams illustrating interference fringes formed on the screen 30 of the collimation evaluation device 100 according to the first comparative example. The interference fringes formed on the screen 30 is a vector sum of a component caused by non-parallelism of the first reflection surface 21 and the second reflection surface 22 of the reflection member 20 and a component caused by non-parallelism of the incident light $L_0$.

When the incident light $L_0$ is collimated light, the interference fringes formed on the screen 30 include only the component caused by the non-parallelism of the first reflection surface 21 and the second reflection surface 22, and do not include the component caused by the non-parallelism of the incident light $L_0$, and for this reason, the interference fringes are parallel to the x axis as illustrated in FIG. 2B.

When the incident light $L_0$ is diverging light or converging light, the interference fringes formed on the screen 30 include the component caused by the non-parallelism of the first reflection surface 21 and the second reflection surface 22, and in addition, the component caused by the non-parallelism of the incident light $L_0$, and for this reason, the interference fringes are inclined with respect to the x axis as illustrated in FIG. 2A and FIG. 2C. In the interference fringes (FIG. 2A) when the incident light $L_0$ is the diverging light and the interference fringes (FIG. 2C) when the incident light $L_0$ is the converging light, inclination directions are opposite to each other.

As such, the collimation of the incident light $L_0$ can be evaluated and the collimation of the light $L_0$ can be adjusted, on the basis of a direction of the interference fringes formed on the screen 30. When a reference line is drawn on the screen 30 and the interference fringes are parallel to the reference line, it can be determined that the incident light $L_0$ is the collimated light.

In the collimation evaluation device 100 according to the first comparative example described above, it is preferable to increase the thickness of the reflection member 20 to be the shear plate, to detect the change in the direction of the interference fringes with respect to the reference line on the screen 30 with high sensitivity. However, when the thickness of the reflection member 20 increases, an optical path difference between the reflected light $L_1$ and the reflected light $L_2$ arriving at the screen 30 increases. Meanwhile, when the optical path difference is shorter than the coherence length of the evaluation object light $L_0$, the interference fringes can be observed on the screen 30.

When the thickness of the reflection member 20 is increased to improve the sensitivity, the optical path difference increases and a collimation evaluation of light of which the coherence length is shorter than the optical path difference cannot be executed. As such, in the collimation evaluation device 100 according to the first comparative example, it is difficult to evaluate the collimation of the light of which the coherence length is short with high sensitivity.

Second Comparative Example

Figure 3:
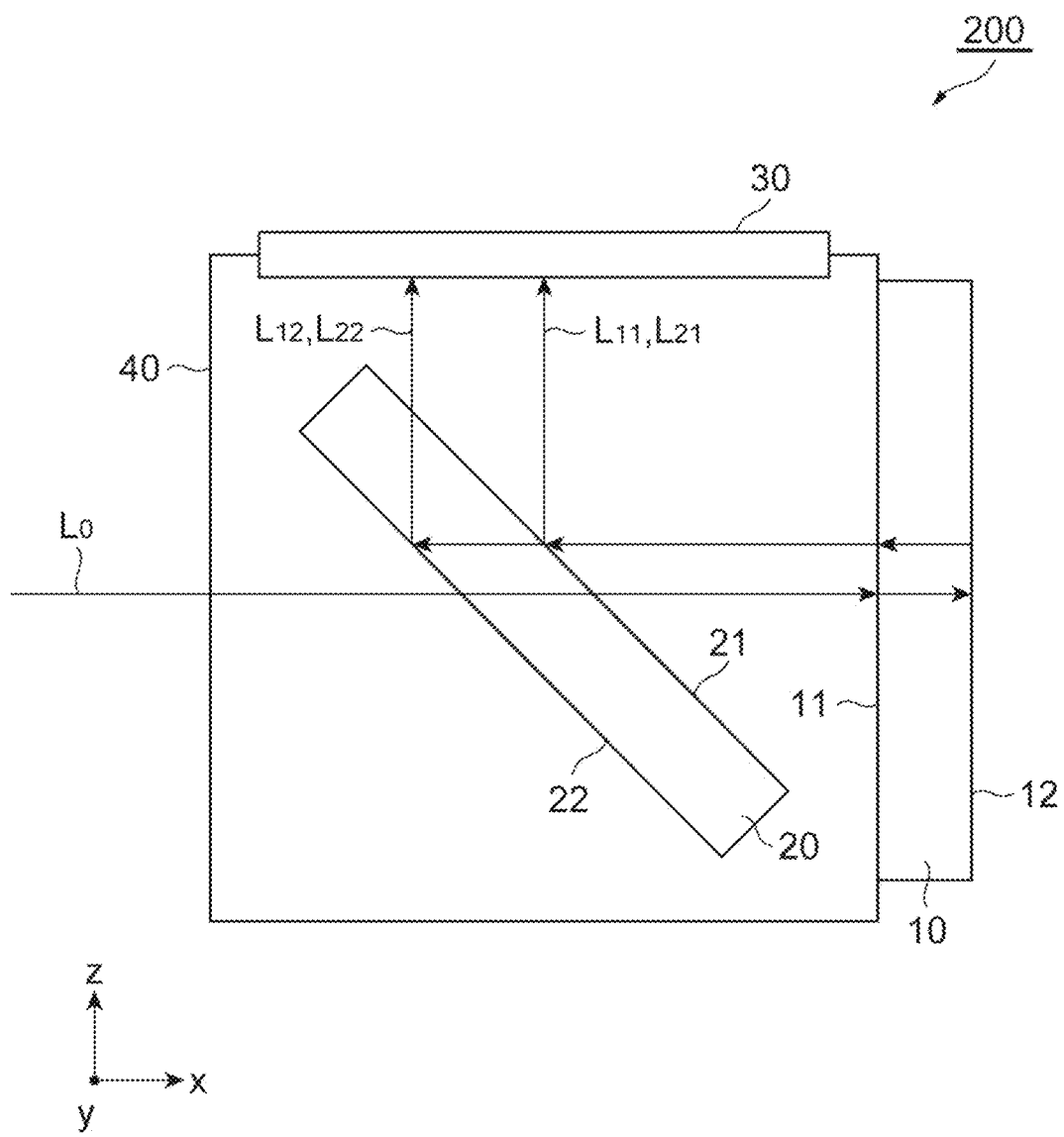
FIG. 3 is a diagram illustrating a configuration of a collimation evaluation device 200 according to a second comparative example.

FIG. 3 is a diagram illustrating a configuration of a collimation evaluation device 200 according to a second comparative example. The collimation evaluation device 200 according to the second comparative example is based on a result of research and development performed by the prevent inventors to solve the above problem of the low sensitivity in the collimation evaluation device 100 according to the first comparative example. The collimation evaluation device 200 according to the second comparative example includes a first reflection member 10, a second reflection member 20, a screen 30, and a housing 40. The first reflection member 10, the second reflection member 20, and the screen 30 are fixed to the housing 40. It is assumed that a direction where light $L_0$ of a collimation evaluation object is incident on the collimation evaluation device 200 is parallel to an x axis.

The first reflection member 10 is a transparent flat plate that has a first reflection surface 11 for reflecting a part of incident light and a second reflection surface 12 for reflecting light transmitted through the first reflection surface 11 in the light. The second reflection member 20 is a transparent flat plate that has a first reflection surface 21 for reflecting a part of incident light and a second reflection surface 22 for reflecting light transmitted through the first reflection surface 21 in the light. A material of the transparent flat plate is, for example, BK7 or synthetic quartz.

The first reflection member 10 is disposed such that, when light having incident in parallel to the x axis and transmitted through the second reflection member 20 is incident, the first reflection member reflects a part of the light by the first reflection surface 11, reflects the light transmitted through the first reflection surface 11 in the light by the second reflection surface 12, and emits these reflected light components in an opposite direction. The second reflection member 20 is disposed such that, when the light emitted from the first reflection member 10 is incident, the second reflection member reflects a part of the light by the first reflection surface 21, reflects the light transmitted through the first reflection surface 21 in the light by the second reflection surface 22, and emits these reflected light components in parallel to a z axis.

Flatness of each of the reflection surfaces 11, 12, 21, and 22 is about a fraction of a wavelength of evaluation object light. In the first reflection member 10, the first reflection surface 11 and the second reflection surface 12 are parallel to each other. The second reflection member 20 is a shear plate in which the first reflection surface 21 and the second reflection surface 22 are non-parallel to each other, a distance between the reflection surfaces changes along a direction parallel to the y axis, and the reflection surfaces form an angle (wedge angle) of about several seconds to several tens of seconds.

The screen 30 is a ground glass plate that is disposed to be parallel to both the x axis and the y axis. Here, light reflected on the first reflection surface 11 of the first reflection member 10 and the first reflection surface 21 of the second reflection member 20 is represented as $L_{11}$. Light reflected on the first reflection surface 11 of the first reflection member 10 and the second reflection surface 22 of the second reflection member 20 is represented as $L_{12}$. Light reflected on the second reflection surface 12 of the first reflection member 10 and the first reflection surface 21 of the second reflection member 20 is represented as $L_{21}$. Further, light reflected on the second reflection surface 12 of the first reflection member 10 and the second reflection surface 22 of the second reflection member 20 is represented as $L_{22}$. These reflected light components $L_{11}$, $L_{12}$, $L_{21}$, and $L_{22}$ are incident on the screen 30.

On the screen 30, the components having optical path differences shorter than a coherence length among these reflected light components $L_{11}$, $L_{12}$, $L_{21}$, and $L_{22}$ interfere with each other, and thus, interference fringes are formed, and the interference fringes can be observed. The screen 30 is an observation unit that enables an observation of the interference fringes. A direction of interference fringes caused by non-parallelism of the first reflection surface 21 and the second reflection surface 22 in the second reflection member 20 and a direction of interference fringes caused by non-parallelism of the incident light are different from each other.

A magnitude relation of the optical path lengths of the reflected light components $L_{11}$, $L_{12}$, $L_{21}$, and $L_{22}$ is as follows. The optical path lengths of these reflected light components are different according to whether light propagates between the first reflection surface 11 and the second reflection surface 12 of the first reflection member 10, and whether light propagates between the first reflection surface 21 and the second reflection surface 22 of the second reflection member 20. Therefore, as compared with the optical path lengths of the reflected light components $L_{12}$ and $L_{21}$, the optical path length of the reflected light component $L_{11}$ is short and the optical path length of the reflected light component $L_{22}$ is long.

When the thickness of each of the first reflection member 10 and the second reflection member 20 is appropriately set, the optical path lengths of the reflected light components $L_{12}$ and $L_{21}$ can be set almost equally and an optical path difference between the reflected light components $L_{12}$ and $L_{21}$ can be set to be smaller than the coherence length. That is, the interference fringes can be formed on the screen 30 by the light $L_{12}$ reflected on the first reflection surface 11 of the first reflection member 10 and the second reflection surface 22 of the second reflection member 20 and the light $L_{21}$ reflected on the second reflection surface 12 of the first reflection member 10 and the first reflection surface 21 of the second reflection member 20.

When a reference line is drawn on the screen 30 and the interference fringes are parallel to the reference line, it can be determined that the incident light is collimated light, and by inclinations of the interference fringes with respect to the reference line, it can be determined that the incident light is diverging light or converging light.

In the second comparative example, interference fringes formed by the light components on the screen 30 on which the reflected light $L_{12}$ and the reflected light $L_{21}$ have been incident are observed, using the first reflection member 10, the second reflection member 20, and the screen 30 described above, and collimation of the incident light is evaluated on the basis of the direction of the observed interference fringes.

In the second comparative example, even when the thickness of the second reflection member 20 is large to improve the sensitivity, and the coherence length of the light of the collimation evaluation object is short, the optical path difference between the reflected light components $L_{12}$ and $L_{21}$ can be set to be smaller than the coherence length, and therefore, the collimation of the light can be evaluated with high sensitivity.

The collimation evaluation device 200 according to the second comparative example corresponds to the case in which the first reflection member 10 for optical path difference correction is added to the same configuration (that is, the configuration including the second reflection member 20, the screen 30, and the housing 40) as the configuration of the collimation evaluation device 100 according to the first comparative example and the incident direction of the evaluation object light is reversed.

Therefore, if there is a commercially available collimation evaluation device having the same configuration as the configuration of the collimation evaluation device 100 according to the first comparative example, the collimation evaluation device 200 according to the second comparative example can be configured by attaching the first reflection member 10 for optical path difference correction to the commercially available collimation evaluation device. As attachment methods, there are a method of attaching the first reflection member 10 to a housing of the commercially available collimation evaluation device by an adhesive or an adhesive tape, a method of attaching the first reflection member 10 to the housing of the commercially available collimation evaluation device by a holder having an adjustment mechanism, and a method of removably attaching the first reflection member 10 to the housing of the commercially available collimation evaluation device by a magnet.

As such, the collimation evaluation device 200 according to the second comparative example forms the interference fringes by the reflected light components $L_{12}$ and $L_{21}$ on the screen 30, so that the device can evaluate collimation of light having a short coherence length with high sensitivity. However, in the collimation evaluation device 200 according to the second comparative example, the reflected light components $L_{11}$ and $L_{22}$ are also incident on an interference fringe formation region on the screen 30, and as a result, there occurs a different problem in which contrast of the interference fringes is deteriorated.

Embodiment

Figure 4:
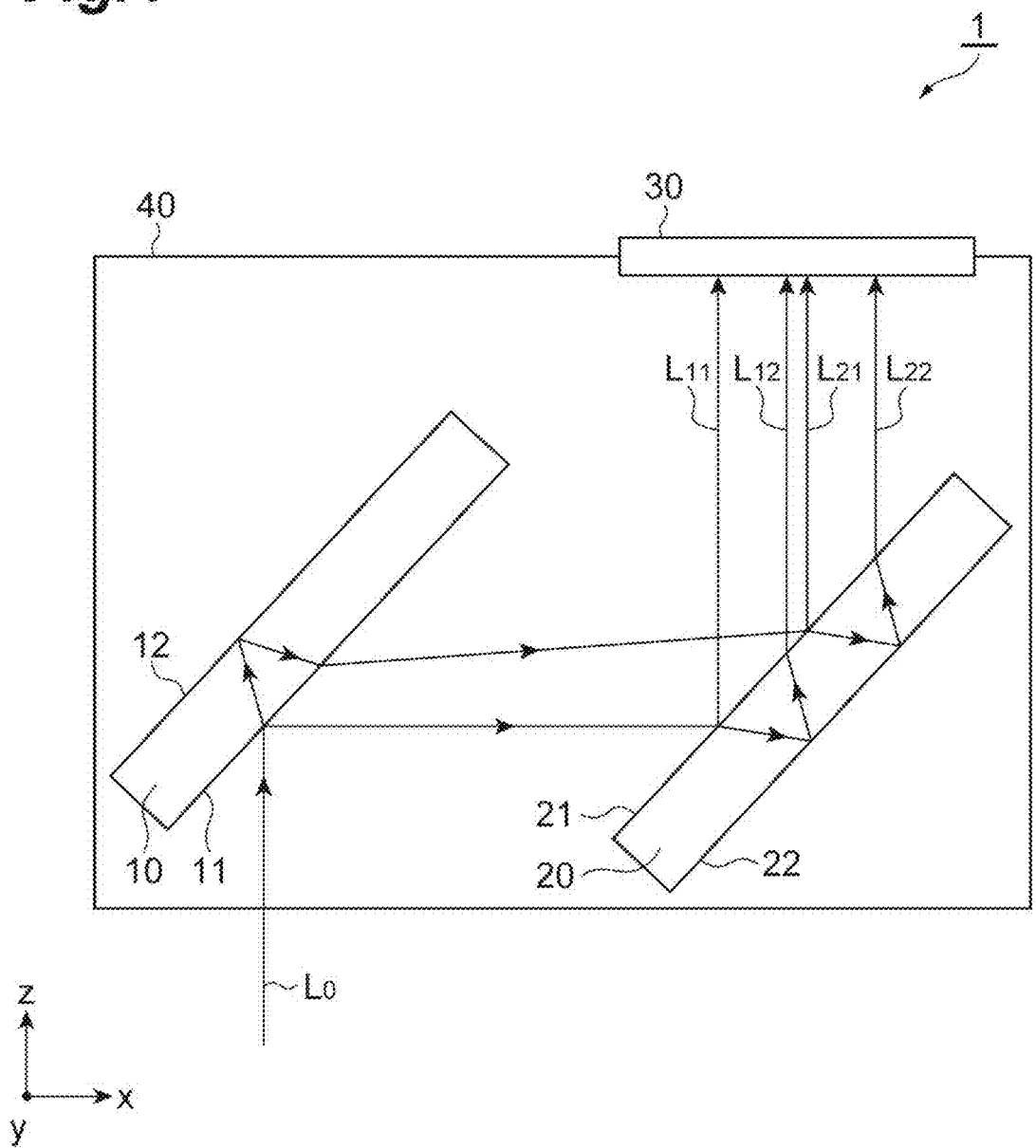
FIG. 4 is a diagram illustrating a configuration of a collimation evaluation device 1 according to an embodiment.

FIG. 4 is a diagram illustrating a configuration of a collimation evaluation device 1 according to an embodiment. The collimation evaluation device 1 according to the embodiment can solve problems of low sensitivity and low contrast in the collimation evaluation devices 100 and 200 according to the comparative examples. The collimation evaluation device 1 according to the embodiment includes a first reflection member 10, a second reflection member 20, a screen 30, and a housing 40. The first reflection member 10, the second reflection member 20, and the screen 30 are fixed to the housing 40. It is assumed that a direction where light $L_0$ of a collimation evaluation object is incident on the collimation evaluation device 1 is parallel to a z axis.

Each of the first reflection member 10 and the second reflection member 20 includes a flat plate that has two surfaces opposite to each other as a first reflection surface and a second reflection surface. In both or one of the first reflection member 10 and the second reflection member 20, the first reflection surface and the second reflection surface are non-parallel to each other, in a direction parallel to both an xz plane (an incidence plane parallel to both incident light and reflected light) and the first reflection surface.

The first reflection member 10, the second reflection member 20, and the screen 30 in the embodiment are the same as those in the second comparative example, but the embodiment is different from the second comparative example in arrangement thereof. That is, in the embodiment, a first reflection surface 11 of the first reflection member 10 and a first reflection surface 21 of the second reflection member 20 face each other and are parallel to each other.

The first reflection member 10 is disposed to reflect a part of light by the first reflection surface 11, reflect light transmitted through the first reflection surface 11 in the light by the second reflection surface 12, and emit reflected light components in a direction parallel to an x axis, when the light is incident in parallel to a z axis. The second reflection member 20 is disposed to reflect a part of light by the first reflection surface 21, reflect light transmitted through the first reflection surface 21 in the light by the second reflection surface 22, and emit reflected light components in parallel to the z axis, when the light emitted from the first reflection member 10 is incident.

Even in this embodiment, similar to the case of the second comparative example, light reflected on the first reflection surface 11 of the first reflection member 10 and the first reflection surface 21 of the second reflection member 20 is represented as $L_{11}$. Light reflected on the first reflection surface 11 of the first reflection member 10 and the second reflection surface 22 of the second reflection member 20 is represented as $L_{12}$. Light reflected on the second reflection surface 12 of the first reflection member 10 and the first reflection surface 21 of the second reflection member 20 is represented as $L_{21}$. Further, light reflected on the second reflection surface 12 of the first reflection member 10 and the second reflection surface 22 of the second reflection member 20 is represented as $L_{22}$.

The screen 30 is a ground glass plate that is disposed to be parallel to both the x axis and the y axis. Reflected light components $L_{11}$, $L_{12}$, $L_{21}$, and $L_{22}$ are incident on the screen 30. Even in this embodiment, similar to the case of the second comparative example, when the thickness of each of the first reflection member 10 and the second reflection member 20 is appropriately set, the optical path lengths of the reflected light components $L_{12}$ and $L_{21}$ can be set almost equally and an optical path difference of the reflected light components $L_{12}$ and $L_{21}$ can be set to be smaller than the coherence length. That is, interference fringes can be formed on the screen 30 by the light $L_{12}$ reflected on the first reflection surface 11 of the first reflection member 10 and the second reflection surface 22 of the second reflection member 20 and the light $L_{21}$ reflected on the second reflection surface 12 of the first reflection member 10 and the first reflection surface 21 of the second reflection member 20.

When a reference line is drawn on the screen 30 and the interference fringes are parallel to the reference line, it can be determined that the incident light is collimated light, and by inclinations of the interference fringes with respect to the reference line, it can be determined that the incident light is diverging light or converging light.

A collimation evaluation method according to this embodiment observes interference fringes formed by light components on the screen 30 on which the reflected light $L_{12}$ and the reflected light $L_{21}$ have been incident, using the first reflection member 10, the second reflection member 20, and the screen 30 described above, and evaluates collimation of the incident light on the basis of a direction of the observed interference fringes.

Even in this embodiment, similar to the case of the second comparative example, even when the thicknesses of the first reflection member 10 and the second reflection member 20 are large for separation of the light components $L_{11}$ and $L_{12}$ and separation of the light components $L_{21}$ and $L_{22}$, and a coherence length of light of a collimation evaluation object is short, the optical path difference between the reflected light components $L_{12}$ and $L_{21}$ can be set to be smaller than the coherence length, and therefore, collimation of the light can be evaluated with high contrast.

In the second comparative example, because the evaluation object light is incident on the first reflection member 10 after being transmitted through the second reflection member 20, there is a loss of the light at the time of transmission in the second reflection member 20. On the other hand, in this embodiment, because the evaluation object light can be directly incident on the first reflection member 10 without transmission in the second reflection member 20, there is no loss due to transmission in the second reflection member 20.

In the second comparative example, the reflected light components $L_{11}$ and $L_{22}$ are incident on a region where the interference fringes are formed by the reflected light components $L_{12}$ and $L_{21}$ on the screen 30, and for this reason, contrast of the interference fringes is deteriorated. Meanwhile, in this embodiment, the first reflection surface 11 of the first reflection member 10 and the first reflection surface 21 of the second reflection member 20 are parallel to each other, and therefore, as illustrated in FIG. 5, it is possible to cause the reflected light components $L_{11}$ and $L_{22}$ not to be incident on the region where the interference fringes are formed by the reflected light components $L_{12}$ and $L_{21}$ on the screen 30 and the contrast of the interference fringes can be improved.

Figure 5:
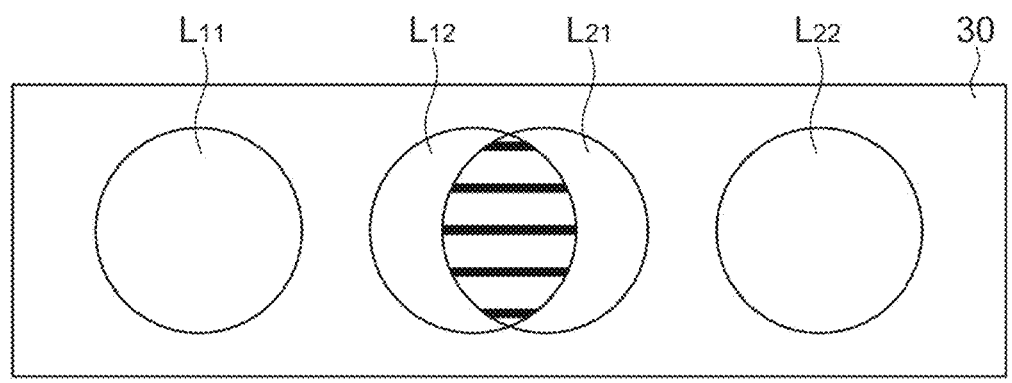
FIG. 5 is a diagram illustrating incident regions of reflected light components on a screen 30 of the collimation evaluation device 1 according to the embodiment.

FIG. 5 is a diagram illustrating incident regions of the individual reflected light components on the screen 30 of the collimation evaluation device 1 according to the embodiment. As illustrated in FIG. 5, incident regions of the reflected light components $L_{12}$ and $L_{21}$ overlap each other on the screen 30, and the interference fringes are formed on an overlapped region. The reflected light components $L_{11}$ and $L_{22}$ are not incident on the interference fringe formation region.

In this embodiment, on the screen 30, the respective incident regions of the reflected light component $L_{11}$ and the reflected light component $L_{22}$ can be formed differently from the interference fringe formation region, and further, can be formed differently from the incident regions of the reflected light components $L_{11}$ and $L_{22}$. Therefore, a beam profile of the incident light $L_0$ can be evaluated on the basis of the reflected light $L_{11}$ or the reflected light $L_{22}$ incident on the screen 30. That is, the collimation evaluation device 1 according to this embodiment can evaluate the collimation of the evaluation object light on the basis of the interference fringes by the reflected light $L_{12}$ and the reflected light $L_{21}$, and further, can evaluate the beam profile of the evaluation object light on the basis of the reflected light $L_{11}$ or the reflected light $L_{22}$.

In this embodiment, preferably, both or one of the first reflection member 10 and the second reflection member 20 is parallelly movable or rotationally movable. For example, a distance between the first reflection member 10 and the second reflection member 20 is changed, so that the lateral shift amounts of the reflected light components $L_{12}$ and $L_{21}$ can be adjusted, and the sensitivity can be adjusted. The first reflection member 10 and the second reflection member 20 are integrally rotationally moved around an axis parallel to the y axis, so that the optical path difference of the reflected light components $L_{12}$ and $L_{21}$ can be adjusted. The parallel movement of the first reflection member 10 or the second reflection member 20 is performed in the direction parallel to both the xz plane and the reflection surface, so that the optical path difference of the reflected light components $L_{12}$ and $L_{21}$ can be adjusted. In addition, any one of the first reflection member 10 and the second reflection member 20 is rotationally moved independently in a direction perpendicular to a plane of paper in the drawing, so that a period of the interference fringes can be adjusted.

Figure 6A:
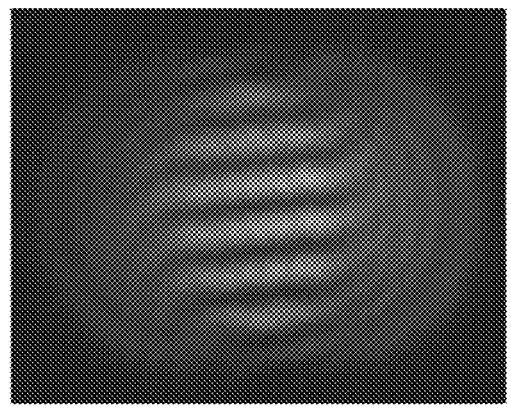
FIG. 6A to FIG. 6C are photographs of interference fringes formed on the screen 30 of the collimation evaluation device 1 according to the embodiment.
Figure 6B:
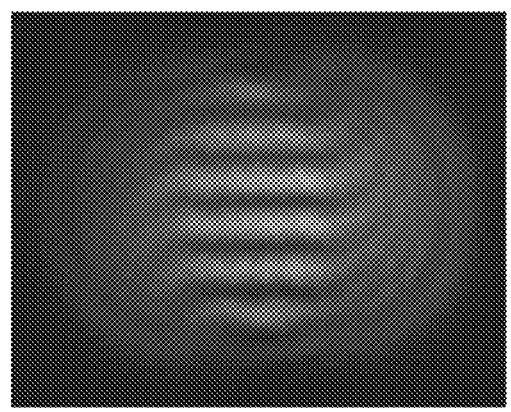
Figure 6C:
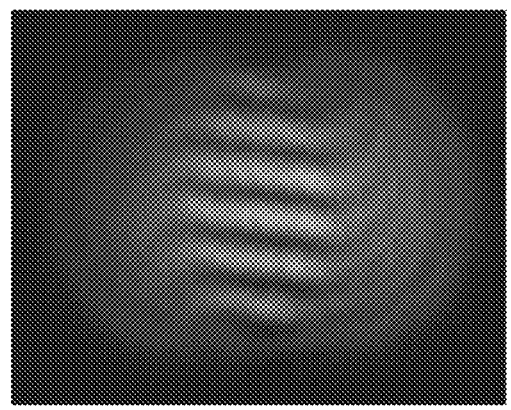

FIG. 6A to FIG. 6C are photographs of interference fringes formed on the screen 30 of the collimation evaluation device 1 according to the embodiment. Here, a wedge substrate WSB-30C05-10-1 manufactured by SIGMAKOKI Co., LTD. is used as each of the first reflection member 10 and the second reflection member 20. A material of this shear plate is BK7, a thickness is 5 mm, a wedge angle is 1 degree, and a diameter is 30 mm. For a direction parallel to the x axis, a distance between the first reflection member 10 and the second reflection member 20 is set as 39 mm.

Laser light that is emitted from an optical fiber end face of an optical fiber laser light source and passes through a lens and has a wavelength of 1080 nm is used as light of an evaluation object. A coherence length of the evaluation object light is 1 mm or less. A beam diameter of the incident light $L_0$ on the collimation evaluation device 1 is set as 6 mm. An incident angle of the incident light $L_0$ on the first reflection member 10 is set as 45 degrees. The interference fringes formed on the screen 30 are imaged by a CCD camera.

FIG. 6A is a photograph of interference fringes when the incident light $L_0$ is diverging light. FIG. 6B is a photograph of interference fringes when the incident light $L_0$ is collimated light. FIG. 6C is a photograph of interference fringes when the incident light $L_0$ is converging light. As illustrated in these figures, even when a coherence length of light of a collimation evaluation object is short, collimation of the light can be evaluated with high sensitivity and high contrast.

Modifications

The present invention is not limited to the embodiment described above and various modifications can be made. For example, in the collimation evaluation device 1 according to the embodiment, the transmission-type screen 30 made of the ground glass plate is used as the observation unit to enable the interference fringes formed by the reflected light components $L_{12}$ and $L_{21}$ to be observed and the interference fringes are observed by the light transmitted and diffused through the screen 30. However, the observation unit to enable the interference fringes to be observed is not limited thereto. FIG. 7 to FIG. 10 are diagrams illustrating configurations of modifications of the collimation evaluation device 1 according to the embodiment. In these modifications, other configuration is adopted as the observation unit to enable the interference fringes to be observed.

Figure 7:
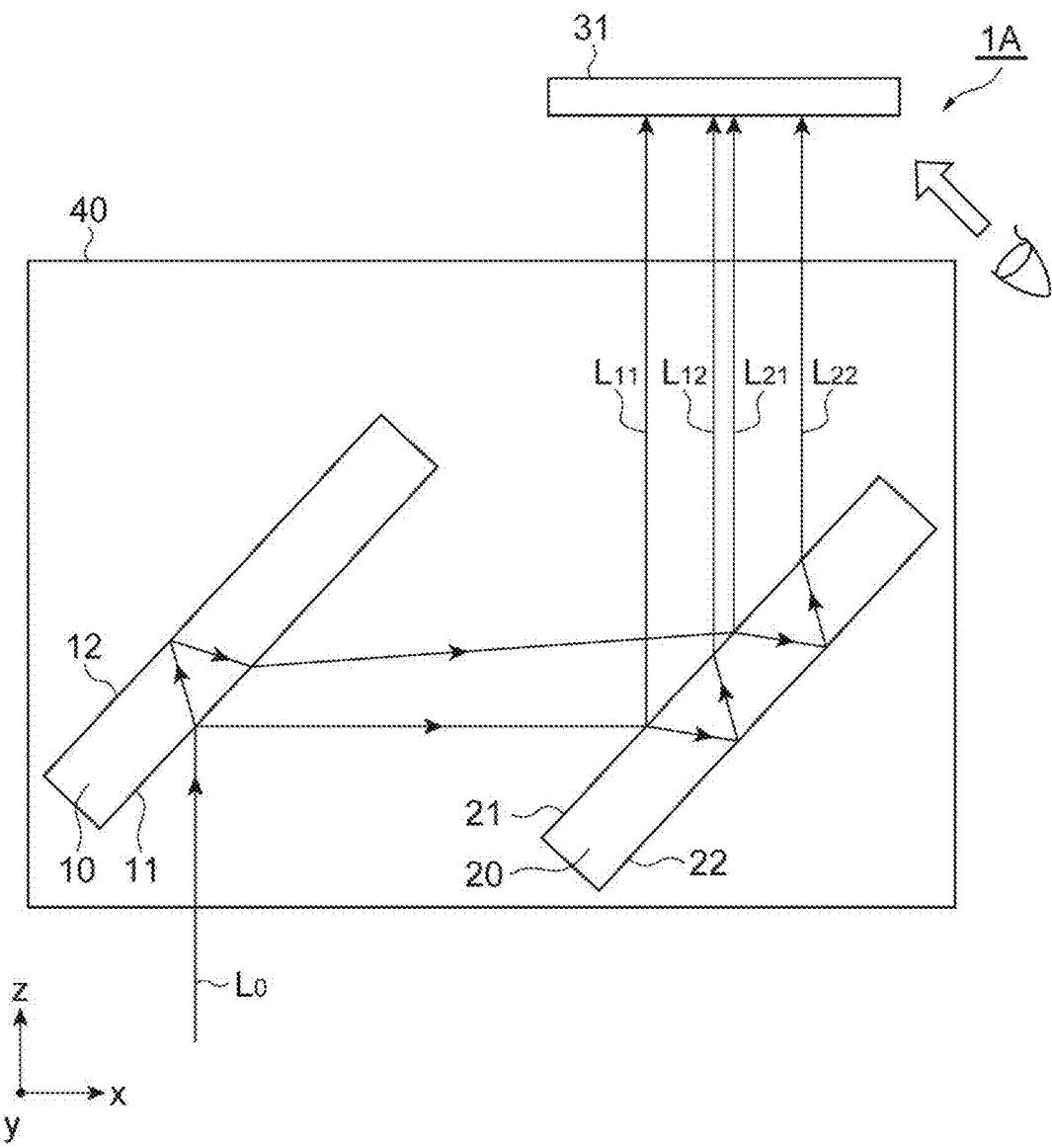
FIG. 7 is a diagram illustrating a configuration of a first modification of the collimation evaluation device according to the embodiment.

A collimation evaluation device 1A according to a first modification illustrated in FIG. 7 uses a reflection-type screen 31 as an observation unit and observes interference fringes by light reflected and diffused by the screen 31. In the case of this configuration, the device is suitable from the viewpoint of safety of an observer, when interference fringes of light having high intensity are observed.

Figure 8:
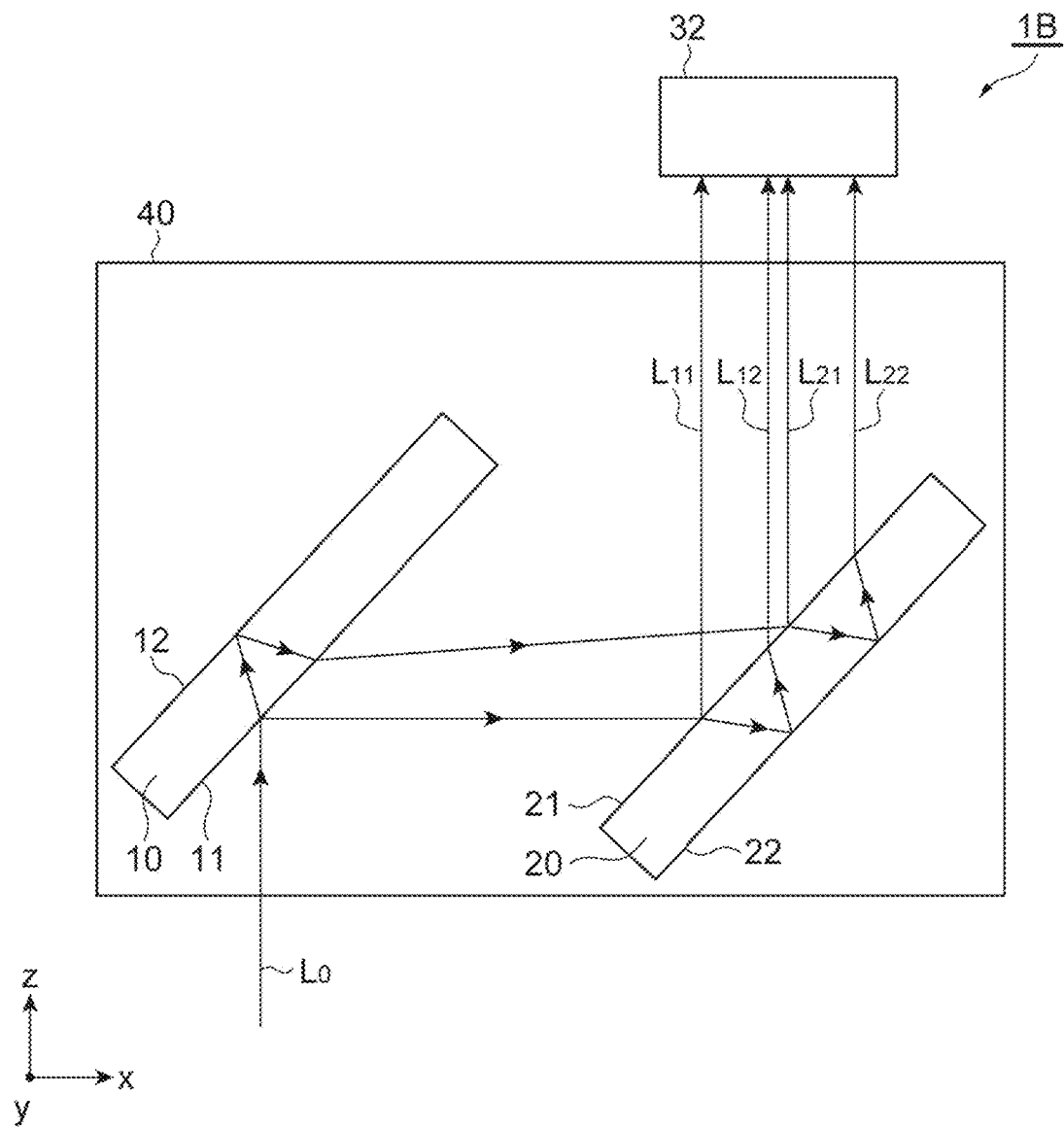
FIG. 8 is a diagram illustrating a configuration of a second modification of the collimation evaluation device according to the embodiment.

A collimation evaluation device 1B according to a second modification illustrated in FIG. 8 uses a camera 32 as an observation unit, displays interference fringes imaged by the camera 32 on a display device, and observes the interference fringes. In the case of this configuration, even when light is light of a wavelength region (an ultraviolet region, an infrared region, and the like) other than visible light, the interference fringes can be observed.

Figure 9:
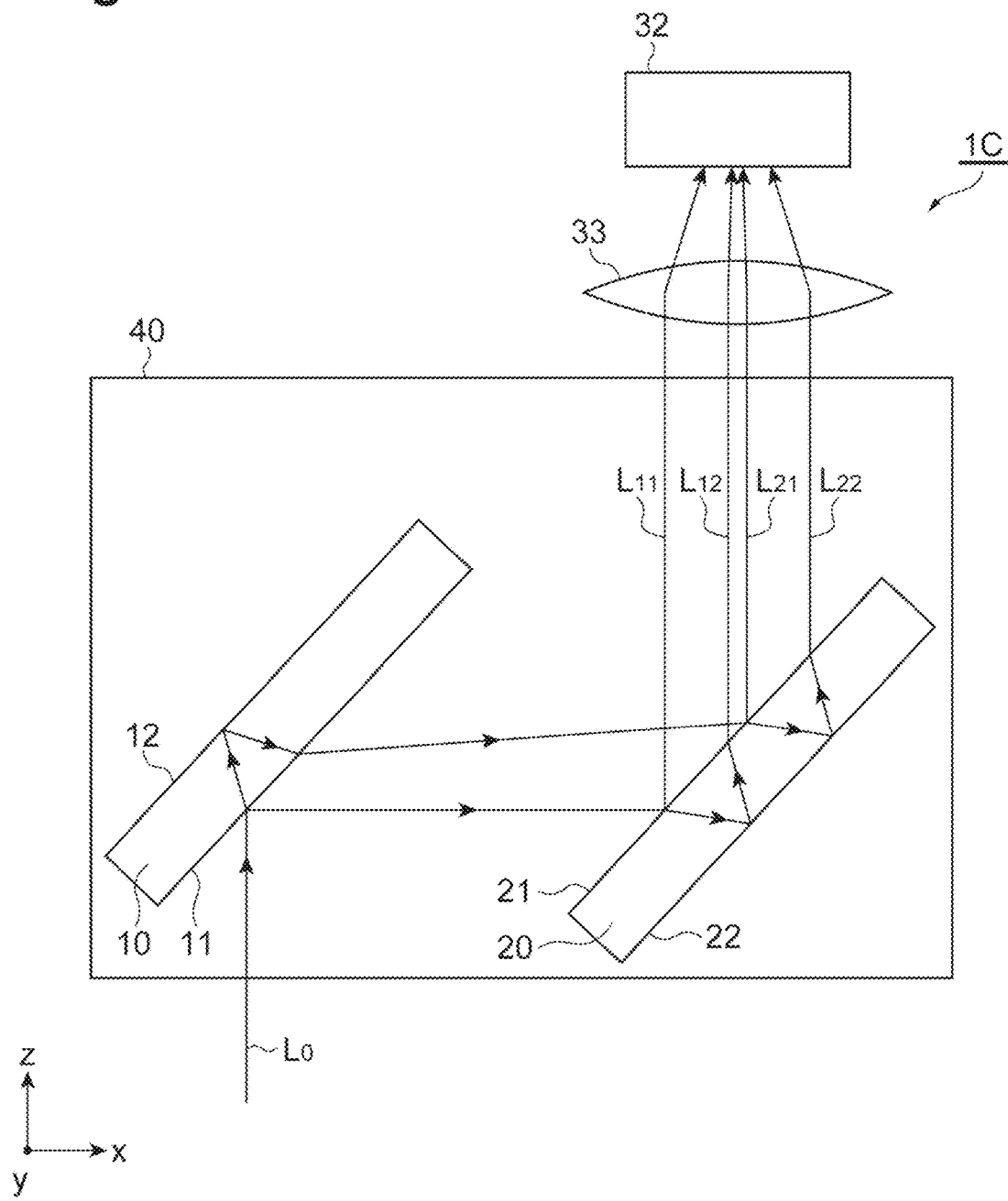
FIG. 9 is a diagram illustrating a configuration of a third modification of the collimation evaluation device according to the embodiment.

A collimation evaluation device 1C according to a third modification illustrated in FIG. 9 uses a lens 33 and a camera 32 as an observation unit, images interference fringes enlarged or reduced by the lens 33 by the camera 32, displays the imaged interference fringes on a display device, and observes the interference fringes. In the case of this configuration, even when light is light of a wavelength region other than visible light, the interference fringes can be observed, and further, the interference fringes can be observed in a desired field of view by changing magnification.

Figure 10:
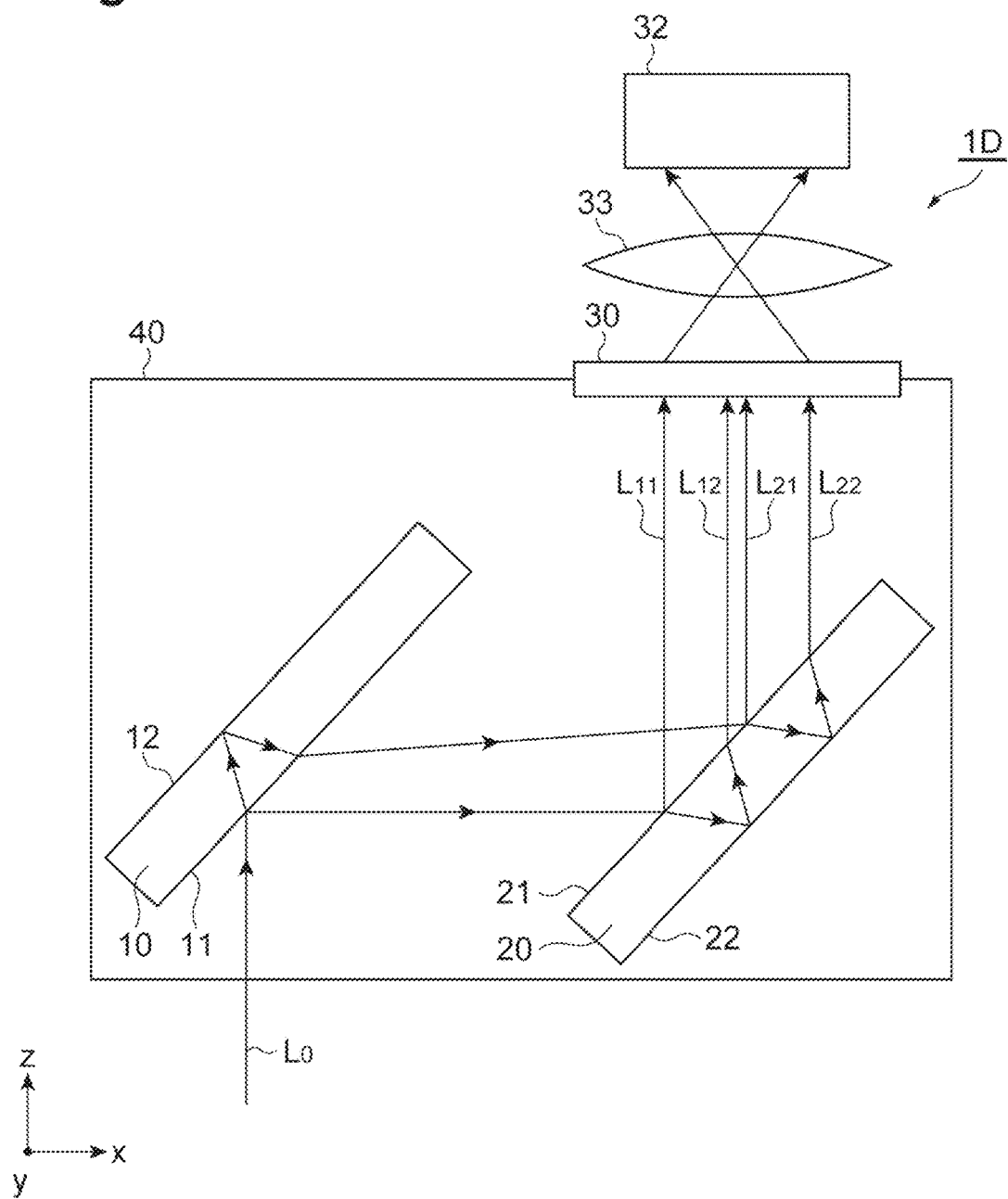
FIG. 10 is a diagram illustrating a configuration of a fourth modification of the collimation evaluation device according to the embodiment.

A collimation evaluation device 1D according to a fourth modification illustrated in FIG. 10 uses a transmission-type screen 30, a lens 33, and an a camera 32 as an observation unit, enlarges or reduces interference fringes on the screen 30 by the lens 33, images the interference fringes by the camera 32, displays the imaged interference fringes on a display device, and observes the interference fringes. In the case of this configuration, even when light is light of a wavelength region other than visible light, the interference fringes can be observed, and further, the interference fringes of desired spacing can be observed by changing magnification. In addition, inclinations of the interference fringes with respect to a reference line drawn on the screen 30 can be confirmed.

The collimation evaluation devices 1B and 1C not using the screen cannot use the reference line on the screen, however, an electron line of the camera 32 can be used as the reference line. In the collimation evaluation devices 1B, 1C, and 1D using the camera 32, the interference fringes by the reflected light $L_{12}$ and the reflected light $L_{21}$ and the beam profile by the reflected light $L_{11}$ or the reflected light $L_{22}$ may be imaged simultaneously by the camera 32, or may be imaged sequentially by moving the camera 32.

The collimation evaluation device and the collimation evaluation method according to the present invention are not limited to the embodiment and the configuration examples described above, and various modifications can be made.

The collimation evaluation device according to the embodiment is configured to include (1) a first reflection member having a first reflection surface for reflecting a part of incident light and a second reflection surface for reflecting light transmitted through the first reflection surface in the incident light, and (2) a second reflection member having a first reflection surface for reflecting a part of light emitted from the first reflection member and a second reflection surface for reflecting light transmitted through the first reflection surface in the light. Further, in the collimation evaluation device, the first reflection surface of the first reflection member and the first reflection surface of the second reflection member face each other and are parallel to each other, and collimation of the incident light is evaluated on the basis of a direction of interference fringes formed by light reflected on the first reflection surface of the first reflection member and the second reflection surface of the second reflection member and light reflected on the second reflection surface of the first reflection member and the first reflection surface of the second reflection member.

The collimation evaluation method according to the embodiment is configured to use (1) a first reflection member having a first reflection surface for reflecting a part of incident light and a second reflection surface for reflecting light transmitted through the first reflection surface in the incident light, and (2) a second reflection member having a first reflection surface for reflecting a part of light emitted from the first reflection member and a second reflection surface for reflecting light transmitted through the first reflection surface in the light. Further, the collimation evaluation method includes causing the first reflection surface of the first reflection member and the first reflection surface of the second reflection member to face each other and to be parallel to each other, observing interference fringes formed by light reflected on the first reflection surface of the first reflection member and the second reflection surface of the second reflection member and light reflected on the second reflection surface of the first reflection member and the first reflection surface of the second reflection member, and evaluating collimation of the incident light on the basis of a direction of the observed interference fringes.

In the above configuration, the first reflection surface and the second reflection surface are preferably non-parallel to each other in a direction parallel to both an incidence plane and the first reflection surface, in both or one of the first reflection member and the second reflection member. The incidence plane is a plane parallel to both of the incident light and the reflected light. In addition, the first reflection surface and the second reflection surface are preferably non-parallel to each other in both of the first reflection member and the second reflection member.

In the above configuration, both or one of the first reflection member and the second reflection member is preferably movable in parallel or rotationally movable. As a result, an optical path difference between the reflected light components $L_{12}$ and $L_{21}$ and a period of the interference fringes can be adjusted.

Further, in the above configuration, a beam profile of the incident light is preferably evaluated on the basis of light reflected on the first reflection surface of the first reflection member and the first reflection surface of the second reflection member or light reflected on the second reflection surface of the first reflection member and the second reflection surface of the second reflection member.

The present invention can be used as a device and a method that can evaluate collimation of light of a collimation evaluation object with high sensitivity and high contrast, even when a coherence length of the light is short.

What is claimed is:

1. A collimation evaluation device comprising:
   a first reflection member having a first reflection surface for reflecting a part of incident light and a second reflection surface for reflecting light transmitted through the first reflection surface in the incident light;
   a second reflection member having a first reflection surface for reflecting a part of light emitted from the first reflection member and a second reflection surface for reflecting light transmitted through the first reflection surface in the light; and
   an observation unit configured to observe light $L_{11}$ reflected on the first reflection surface of the first reflection member and the first reflection surface of the second reflection member, light $L_{12}$ reflected on the first reflection surface of the first reflection member and the second reflection surface of the second reflection member, light $L_{21}$ reflected on the second reflection surface of the first reflection member and the first reflection surface of the second reflection member, and light $L_{22}$ reflected on the second reflection surface of the first reflection member and the second reflection surface of the second reflection member, and configured to enable interference fringes formed by the light $L_{12}$ and the light $L_{21}$ to be observed, wherein
   the first reflection surface of the first reflection member and the first reflection surface of the second reflection member face each other and are parallel to each other,
   an incidence plane is defined as a plane parallel to both the incident light and the reflected light, and the first reflection surface and the second reflection surface are non-parallel to each other in a direction parallel to both the incidence plane and the first reflection surface, in both or one of the first reflection member and the second reflection member,
   the observation unit is configured such that incident regions of the light $L_{12}$ and the light $L_{21}$ overlap each other and do not coincide with each other on the observation unit, the interference fringes are formed on an overlapped region, and the light $L_{11}$ and the light $L_{22}$ are not incident on the overlapped region being an interference fringe formation region, and
   the collimation evaluation device is configured to evaluate collimation of the incident light on the basis of a direction of the interference fringes formed by the light $L_{12}$ and the light $L_{21}$ on the observation unit.

2. The collimation evaluation device according to claim 1, wherein both or one of the first reflection member and the second reflection member is configured to be parallelly movable or rotationally movable.

3. The collimation evaluation device according to claim 1, wherein the collimation evaluation device is configured to evaluate a beam profile of the incident light on the basis of the light $L_{11}$ or the light $L_{22}$ incident on the observation unit.

4. A collimation evaluation method comprising:
   using a first reflection member having a first reflection surface for reflecting a part of incident light and a second reflection surface for reflecting light transmitted through the first reflection surface in the incident light,
   a second reflection member having a first reflection surface for reflecting a part of light emitted from the first reflection member and a second reflection surface for reflecting light transmitted through the first reflection surface in the light, and
   an observation unit configured to observe light $L_{11}$ reflected on the first reflection surface of the first reflection member and the first reflection surface of the second reflection member, light $L_{12}$ reflected on the first reflection surface of the first reflection member and the second reflection surface of the second reflection member, light $L_{21}$ reflected on the second reflection surface of the first reflection member and the first reflection surface of the second reflection member, and light $L_{22}$ reflected on the second reflection surface of the first reflection member and the second reflection surface of the second reflection member, and configured to enable interference fringes formed by the light $L_{12}$ and the light $L_{21}$ to be observed;
   causing the first reflection surface of the first reflection member and the first reflection surface of the second reflection member to face each other and to be parallel to each other;
   defining an incidence plane as a plane parallel to both the incident light and the reflected light, and causing the first reflection surface and the second reflection surface to be non-parallel to each other in a direction parallel to both the incidence plane and the first reflection surface, in both or one of the first reflection member and the second reflection member;
   causing incident regions of the light $L_{12}$ and the light $L_{21}$ to overlap each other and not to coincide with each other on the observation unit, the interference fringes to be formed on an overlapped region, and the light $L_{11}$ and the light $L_{22}$ to be not incident on the overlapped region being an interference fringe formation region;
   observing the interference fringes formed by the light $L_{12}$ and the light $L_{21}$ on the observation unit; and
   evaluating collimation of the incident light on the basis of a direction of the observed interference fringes.

5. The collimation evaluation method according to claim 4, wherein both or one of the first reflection member and the second reflection member is parallelly movable or rotationally movable.

6. The collimation evaluation method according to claim 4, wherein a beam profile of the incident light is evaluated on the basis of the light $L_{11}$ or the light $L_{22}$ incident on the observation unit.

* * * * *